UNITED STATES PATENT OFFICE 2,356,016

METHODS OF COATING ARTICLES WITH GLASS

Gordon L. Strubler, Corning, N. Y.

No Drawing. Application October 8, 1941,
Serial No. 414,154

8 Claims. (Cl. 117—104)

This invention relates to improvements in methods of coating articles with glass.

Efforts have heretofore been made to coat articles with glass by spraying molten glass onto them. For this purpose powdered glass is maintained in a reservoir and ejected therefrom by pneumatic pressure into a burner chamber and a path of flame so directed as to melt the glass and deposit it in a molten state upon the article to be coated of metal, stone, cement, or whatever it may be. Apparatus for doing this is shown in my Patent No. 2,085,278 granted June 29, 1937. The device there shown consists, briefly, of a container for the powdered glass, from which the glass particles are forced by compressed air or air pressure through a nozzle into the burner chamber. The latter consists of an elongated casing, open at its far end, coated with refractory material, and having burner nozzles therein directed toward the open end, for burning a combustible gas which melts the glass particles and directs them through the burner chamber and deposits the molten glass upon the article to be coated. This device operates successfully for its intended purpose, but its weight of 350 lbs. and size of fire chamber, 50 inches long and approximately 15 inches diameter externally, places a practical limitation on its usefulness for all purposes, particularly in its portability and ability to spray small articles, and the more inaccessible portions of larger articles and objects. This length of burner chamber, however, has heretofore been thought necessary, in order to provide a flame path and period of time long enough to enable the powdered glass to become molten throughout its mass due to the low heat conductivity of the glass or vitreous enamel used for this purpose. Unless the glass particles are reduced to a molten state throughout, they will have a hard core and not spray properly upon the object to be coated. Merely increasing the temperature of the combustion chamber is not a solution of the problem, as at higher temperatures the glass particles merely become hardened on their outer surface and will not melt or spray properly.

Also, in heating the various glasses, most suitable for particular purposes, providing proper temperature control and sufficient period of time for melting, which varies with different kinds of glass, is a considerable problem in apparatus of this nature.

Another difficulty has been that in higher temperatures of the combustion gases, the alkali in the glass is extracted from its surface, leaving it pitted, as shown by the microscope, and a much poorer and weaker glass.

After considerable research, I have discovered that the radiant heat from the walls of the burner chamber is more responsible for heating the glass particles, than the convection currents of the hot burning gases, or conduction. Better results are obtained, for instance, with the harder glasses by preheating the burner chamber until its refractory walls are red hot, thereby greatly increasing the radiant heat from the walls, without increasing the temperature of the burner chamber. As heating by radiation is effective as to the fourth power of the difference in temperature (Absolute or Kelvin) and inversely to the square of the distance between the radiation surface and the absorptive surface, it is apparent that decreasing the distance between the radiation surfaces and the absorptive surface of the glass is much more important and effective than increasing the temperature.

I have, therefore, endeavored to find methods and means of decreasing the distance between the radiation surfaces and the absorptive surfaces of the glass and so decrease the size and weight of the apparatus, which will at the same time permit the glass to be properly heated and sprayed upon the object to be coated, will not clog the burner chamber, nor otherwise impair, the coating process or apparatus. I have discovered that this object can be achieved by adding and mixing a powdered solid combustible material to the powdered glass. This brings the combustible material in closer proximity to the glass particles during their travel through the heated zone, and thus increases the radiant heat passing from the combustible materials to the glass particles, thereby causing quicker melting of the glass particles.

I have also discovered the addition of an alkali to the atmosphere of the burning gases retards the extraction of alkali from the surface of the powdered glass in passing through the heating zone, thus permitting a more durable glass to be sprayed on the articles to be coated. The addition of alkali to the combustion gases also permits a higher temperature to be used.

The addition and mixture of the solid combustible particles to the powdered glass particles enables me to cut down the melting time required for melting the glass very materially, and enables me to reduce the size of the burner chamber to 18 inches long and reduce the weight of my apparatus to 25 lbs., thus making it easily portable and capable of spraying articles and portions of articles hitherto impossible or impracticable. At the same time, I am enabled more accurately to control the temperature for various glasses, which vary in their melting points, heat conductivity and in other properties.

Before explaining in detail the present invention it is to be understood that the invention is not limited in its application to the details of materials, steps and arrangements described, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The powdered solid combustible material to be added and mixed to the powdered glass may be coal, coke, charcoal or other carbon, sawdust, magnesium, aluminum or the like. Any substance, of which many are known, that will during its travel through the heating zone throw off radiant heat rays to be absorbed by the glass particles is suitable for this purpose. The powdered combustible materials may be varied according to the particular formula of glass used or they may be blended to obtain best results. For instance, with a glass having a low heat conductivity and thus requiring a longer period of time in which to become melted throughout, it is advantageous to combine two or more solid fuels so that one will burn very quickly and when it has passed its peak of radiation, the other fuel will ignite and thus extend the period of effective heat radiation.

Being closely admixed with the glass particles, the distance of travel for the radiant heat waves from the powdered combustible materials to the absorptive surface of the glass is very small—much less, of course, than the distance of travel of the waves radiated from the refractory walls. This advantage is best expressed in the radiation distance law:

$$I = \frac{I_1}{R^2}$$

where $I_1$=intensity at 1 foot and $R$=distance in feet.

The effectiveness of controlling radiation by distance, instead of temperature, is best brought out by contrast with the radiation temperature law known as the Stefan-Boltzman law:

$$q = CA\left(\frac{T_1}{100}\right)^4 - \left(\frac{T_2}{100}\right)^4$$

where $C$=radiation constant, $A$=area of absorbing surface, $T_1$=temperature of radiation surface, and $T_2$=temperature of absorption surface.

The powdered combustible material can also be raised to a much higher temperature than it is practical to heat the refractory wall. The better commercial refractories can be heated only to about 1250° C. in an alkaline atmosphere. As the combustible material is constantly renewed it is practical to raise its temperature to the decomposition point which can easily be in excess of 2000° C. With the refractory wall at 1250° C. or 1523° A. and the combustible temperature of the powdered fuel at 2000° C. or 2273° A. the radiation value of powdered combustible material as compared with that of the refractory walls is in the order of 5 to 1 ($2273^4$ to $1523^4$). Thus, if the heat waves radiated from the refractory walls have to travel 2½ inches from the wall to the glass particles and from the particles of combustible material mixed with the powdered glass have to travel only ¼ inch, the inverse square would be 100 to 1. The advantage of thus securing increased radiant heat by adding the powdered combustible material to the glass particles and thus flow through the heated zone together, becomes thus readily apparent.

To prevent the extraction of alkali from the surface of the powdered glass while passing through the heated zone, particularly in the higher temperatures, I find it desirable to provide an alkaline atmosphere in the heating zone. This can be done by adding a small percentage of alkali, such as 1% of soda ash ($Na_2CO_3$) to the powdered glass. The alkaline mixtures which can thus be used are, of course, innumerable. Some of them are borax, the soda compounds, lithium carbonate, and potassium carbonate. The alkaline atmosphere in the heating chamber can likewise be obtained in other ways, of course, and my invention is not limited to this precise method. By not permitting extraction of the alkali from the glass, a much more durable and stronger glass is possible.

In this manner, I am enabled to greatly reduce the weight and size of the apparatus required for coating various articles with molten glass and to control the necessary temperature and period of exposure to heat for proper melting of various glasses under all sorts of conditions, and to greatly increase the usefulness of my apparatus for the coating of many kinds and sizes of articles with glass.

I claim:

1. The method of coating articles with molten glass produced by heating glass particles in a heating zone, which includes increasing the radiant heat available for melting the glass particles by burning a finely divided combustible solid material in the heating zone in the presence of the glass particles.

2. The method of coating articles with molten glass produced by heating glass particles in a heating zone, which includes increasing the radiant heat available for melting the glass particles by introducing a finely divided combustible solid material into the heating zone, and heating the glass particles by the combined combustion of a gaseous fuel and the finely divided combustible solid material.

3. The method of coating articles with molten glass produced by heating glass particles in a heating zone, which includes increasing the radiant heat available for melting the glass particles by adding a finely divided combustible solid material to the powdered glass particles and heating them together during their passage through the heating zone.

4. The method of coating articles with molten glass produced by heating glass particles in a heating zone, which includes increasing the radiant heat available for melting the glass particles by adding finely divided combustible solid material to the glass particles and by heating the glass particles through the combined combustion of a gaseous fuel and the finely divided combustible solid material.

5. The method of coating articles with molten glass produced by heating glass particles in a heating zone, which includes adding finely divided combustible material to the powdered glass particles, ejecting the mixture by pressure into the heating zone, heating the glass particles through the combined combustion of a gaseous fuel and the finely divided combustible solid material to increase the radiant heat available for melting the glass particles, and directing the molten glass particles against the article to be coated.

6. The method of coating articles with molten glass produced by heating glass particles in a heating zone, which includes increasing the radiant heat available for melting the glass particles by burning a finely divided combustible solid material in the heating zone in the presence of the glass particles, and creating an alkaline atmosphere in the heating zone at the same time for retarding extraction of alkali from the glass particles by introducing a finely divided solid alkaline material into the heating zone.

7. The method of coating articles with molten glass produced by heating glass particles in a heating zone, which includes increasing the radiant heat available for melting the glass particles by introducing a finely divided combustible solid material in the heating zone in the presence of the glass particles, and introducing a finely divided solid alkaline material into the heating zone to create an alkaline atmosphere for retarding extraction of the alkali from the glass particles.

8. The method of coating articles with molten glass produced by heating glass particles in a heating zone, which includes increasing the radiant heat available for melting the glass particles by introducing a finely divided combustible solid material into the heating zone, and heating the glass particles by the combined combustion of a gaseous fuel and the finely divided combustible solid material, and creating an alkaline atmosphere at the same time for retarding extraction of the alkali from the glass particles by introducing a finely divided solid alkaline material into the heating zone.

GORDON L. STRUBLER.